United States Patent
Grass et al.

(10) Patent No.: US 7,426,650 B2
(45) Date of Patent: Sep. 16, 2008

(54) ASYNCHRONOUS WRAPPER FOR A GLOBALLY ASYNCHRONOUS, LOCALLY SYNCHRONOUS (GALS) CIRCUIT

(75) Inventors: Eckhard Grass, Berlin (DE); Milos Krstic, Frankfurt (DE)

(73) Assignee: IHP GmbH-Innovayions for High Performance Microelectronics/Institut fur Innovative Mikroelektronik (DE)

( * ) Notice: Subject to any disclaimer, the term of this patent is extended or adjusted under 35 U.S.C. 154(b) by 94 days.

(21) Appl. No.: 10/542,938

(22) PCT Filed: Dec. 29, 2003

(86) PCT No.: PCT/EP03/14959

§ 371 (c)(1),
(2), (4) Date: Dec. 16, 2005

(87) PCT Pub. No.: WO2004/066526

PCT Pub. Date: Aug. 5, 2004

(65) Prior Publication Data

US 2006/0161797 A1    Jul. 20, 2006

(30) Foreign Application Priority Data

Jan. 24, 2003    (DE) ................ 103 03 673

(51) Int. Cl.
*G06F 1/12* (2006.01)
*G06F 1/32* (2006.01)
*G06F 1/00* (2006.01)
(52) U.S. Cl. .............. 713/400; 713/320; 713/322
(58) Field of Classification Search .......... 713/400, 713/320, 322

See application file for complete search history.

(56) References Cited

U.S. PATENT DOCUMENTS 6,295,300 B1 * 9/2001 Oyama ................ 370/503

(Continued)

OTHER PUBLICATIONS

IEEE Std. 802.11a-1999 (supplement to IEEE Std 802.11-1999); Part 11: Wireless LAN Medium Access Control (MAC) and Physical Layer (PHY) Specification; High-speed Physical Layer in the 5 GHz Band.

(Continued)

*Primary Examiner*—Thomas Lee
*Assistant Examiner*—Ji H Bae
(74) *Attorney, Agent, or Firm*—Ware, Fressola, Van Der Sluys & Adolphson LLP (57) ABSTRACT

The invention concerns an asynchronous wrapper for a globally asynchronous, locally synchronous circuit. The asynchronous wrapper operates with a request signal-driven clock control, supplemented by a local clock unit in the absence of request signals. It has at least one input unit which is adapted to receive a request signal from outside and to indicate to the outside the reception of the request signal by the delivery of an associated acknowledgement signal, and a pausable clock unit which is adapted to repeatedly produce a first clock signal and to deliver it to an internally synchronous circuit block associated with the asynchronous wrapper. The input unit is adapted to produce, if a request signal is applied, a second clock signal which is in a defined time relationship with the request signal and to deliver it to the internally synchronous circuit block. There is further provided a time-out unit which is connected to the input unit and which is adapted to start the delivery of the first clock signal when external request signals are absent over a given period of time.

15 Claims, 7 Drawing Sheets

U.S. PATENT DOCUMENTS

| | | | | |
|---|---|---|---|---|
| 6,513,128 | B1* | 1/2003 | Wang et al. | 713/600 |
| 6,850,092 | B2* | 2/2005 | Chelcea et al. | 326/93 |
| 6,850,754 | B2* | 2/2005 | Nakano | 455/438 |
| 6,986,074 | B2* | 1/2006 | Alia et al. | 713/601 |
| 7,093,152 | B2* | 8/2006 | Shikata et al. | 713/501 |
| 2005/0141257 | A1* | 6/2005 | Kessels et al. | 365/145 |

OTHER PUBLICATIONS

2002 IEEE; Simon Moore et al., Computer Laboratory, Univ. of Cambridge, UK, Simon.Moore@cl.cam.ac.uk; *Point to Point GALS Interconnect*.

Ran Ginosar et al, VLSI Systems Research Center, Technion—Israel Inst. of Technology, Haifa 32000, Israel; *Adaptive Synchronization*.

The Association for Computing Machinery, 1515 Broadway, New York, NY 10036; *Proceedings of the 38th Design Automation Conference*.

Eckhard Grass et al, University of Oulu; IEEE Personal Communications, Dec. 2001, *On the Single-Chip Implementation of a Hiperlan/2 and IEEE 802.11 a Capable Modem*.

Daniel M. Chapiro, Department of Computer Science, Stanford Univ., Stanford, CA 94305, Oct. 1984, UB/TIP Hannover, Report No. STAN-CS-84-1026; *Globally-Asynchronous Locally-Synchronous Systems*.

Tormod Njolstad et al., IEEE 2001, *A Socket Interface for GALS Using Locally Dynamic Voltage Scaling for Rate-Adaptive Energy Saving*, Norwegian Univ. of Science and Technology (NTNU), Norway.

Schengxian Zhuang et al., IEEE 2002, *Asynchronous Data Communication with Low Power for GALS Systems*, Electronics Systems, Dept. of Electrical Engineering, Linkoping, Sweden.

Jens Muttersbach, *Globally-Asynchronous Locally-Synchronous Architecture for VLSI Systems*, (A dissertation submitted to the Swiss Federal Institute of Technology, Zurich, Diss. ETH No. 14155).

Kenneth Y. Yun, *Pausible Clocking: A First Step Toward Heterogeneous Systems*, Dept. of Electrical and Computer Engineering University of California, San Diego.

S.W. Moore et al., IEEE 2000, *Self Calibrating Clocks for Globally Asynchronous Locally Synchronous Systems*, University of Cambridge, Cambridge, United Kingdom.

Jens Muttersbach et al., IEEE 2000, *Practical Design of Globally-Asynchronous Locally-Synchronous Systems*, Integrated Systems Laboratory, Swiss Federal Institute of Technolgoy Zurich, Switzerland.

David S. Bormann, et al., IEEE 1997, *Asynchronous Wrapper for Heterogeneous Systems*, Department of Electricial and Electronics Engineering Imperial College of Science, Technology and Medicine, United Kingdom.

* cited by examiner

ASYNCHRONOUS WRAPPER FOR A GLOBALLY ASYNCHRONOUS, LOCALLY SYNCHRONOUS (GALS) CIRCUIT

CROSS REFERENCE TO RELATED APPLICATIONS

This application is for entry into the U.S. national phase under §371 for International Application PCT/EP03/14949 having an international filing date of Dec. 29, 2003, and from which priority is claimed under all applicable sections of Title 35 of the United States Code including, but not limited to, Sections 120, 363 and 365(c), and which in turn claims priority under 35USC §119 to German Patent Application No. 10303673.3-53 filed on Jan. 24, 2003.

TECHNICAL FIELD

The invention concerns an asynchronous wrapper for a globally asynchronous, locally synchronous (GALS) circuit. It further concerns a GALS circuit and a method of clock control of an internally synchronous circuit block.

BACKGROUND ART

Nowadays highly integrated semiconductor components for wireless communication include digital as well as analog circuits for data and signal processing on a chip. Digital signal-processing circuits are implemented by means of dedicated datapath-oriented circuits. Alternatively, implementation with a DSP (digital signal processor) is possible. A system with datapath architecture typically has complex circuit blocks which execute expensive and complicated arithmetic or trigonometric operations. A 5 GHz modem for wireless operation in an LAN (local area network) in accordance with the Standard IEEE 802.11a includes for example an FFT/IFFT (fast Fourier transform/inverse FFT) processor, a Viterbi decoder, a CORDIC processor and cross- and auto-correlators. The communication between those blocks is effected at high data rates. In that case periods of long inactivity frequently follow time portions with a high data throughput.

A serious technical problem in modern ASICs (application specific integrated circuits) is synchronisation of the different functional blocks which are integrated on a chip. The use of a global time clock for all functional blocks is to be embodied in the design only at a high level of complication and expenditure. In addition a synchronous global time clock produces increased electromagnetic interference (EMI). That causes difficulties in terms of integrating analog and digital circuits on a chip.

To resolve the above-indicated problems, in recent times so-called globally asynchronous, locally synchronous (GALS) circuit architectures have been proposed. Synchronously operating circuits trigger all storage operations in accordance with a common time raster which is defined by the status of a global signal. That signal is identified as the clock. Usually the rising edge of the clock signal is used for triggering storage operations. The disadvantage of synchronously operating circuits is that the basic assumption that the clock signal is available to all parts of the circuitry at the same moment in time—that is to say synchronously—is not correct in reality. That is governed by the signal propagation time.

Asynchronous circuits dispense with a time raster with discrete time steps. The function of asynchronous circuits is based on the occurrence of events. The instantaneous condition of the circuit is determined completely by the polarity of signal changes and the sequence thereof.

GALS circuits have circuit blocks which operate internally synchronously. Those locally synchronous circuit blocks communicate with each other asynchronously, that is to say by means of a handshake protocol. There is therefore no need for the individual, locally synchronised circuit blocks also to be globally synchronised with each other. As long as each individual locally synchronous block follows the handshake protocol, those circuit blocks can be combined together in any manner.

A GALS architecture is distinguished by a modular structure which permits a high level of flexibility in the circuit design. For, as the interface in relation to any locally synchronous circuit module is asynchronous, any synchronous circuits can be integrated with each other. Any locally synchronous circuit block can have a time raster with an individual clock signal frequency.

For conversion of the asynchronous communication between the locally synchronous circuit blocks, they each have a respective asynchronous wrapping circuit which is also referred to as an 'asynchronous wrapper'. An asynchronous wrapper has input and output ports as well as a local clock signal generator. Each port of the wrapper, that is to say each input and each output, has an associated port control which is responsible for conversion of the handshake protocol. The port and the control together form an input unit and an output unit respectively.

The clock signal generator of an asynchronous wrapper is adapted to produce the clock signal at a signal frequency which is tuneable in a given frequency range. An important feature of clock signal generators for asynchronous wrappers is that the production of the clock signal can be interrupted (it is pausable).

The publication by David S Bormann, Peter Y K Cheoung, Asynchronous Wrapper for Heterogeneous Systems, In Proc International Conf Computer Design (ICCD), October 1997, pages 307 through 314 discloses an asynchronous wrapper with an input unit, an output unit and a clock signal generator. At the same time that article describes a method of clock control of an internally synchronous circuit block of an integrated circuit by means of an asynchronous wrapper. The input unit or the output unit produce and send a stretch signal to the clock signal generator when a request signal of an adjacent preceding circuit block was received at the input or a request signal was sent at the output to an adjacent subsequent circuit block. The stretch signal is present at a control input of the clock signal generator until a handshake has taken place for data exchange with an adjacent circuit. As long as the stretch signal is present the delivery of the next clock signal from the clock signal generator to the synchronous circuit block is delayed. In that way circuit blocks can be individually internally synchronously clock controlled and at the same time exchange data asynchronously with circuit blocks in the environment.

A disadvantage is that this asynchronous wrapper is designed for uses which are not specified in greater detail and it is therefore not suited to circuit environments which are predetermined in an individual case. That applies in particular in regard to power consumption which is required for a GALS block. Mechanisms for reducing the power consumption can only be implemented with difficulty, with the known asynchronous wrappers.

DISCLOSURE OF THE INVENTION

The technical object of the present invention is to provide an asynchronous wrapper which permits the implementation of a GALS block with a low power consumption.

In accordance with a first aspect of the invention, that object is attained by an asynchronous wrapper having at least one input unit which is adapted to receive a request signal from outside and to indicate to the outside the reception of the request signal by the delivery of an associated acknowledgement signal, a pausable clock unit which is adapted to repeatedly produce a first clock signal and deliver it to an internally synchronous circuit block associated with the asynchronous wrapper, wherein the input unit is adapted in response to the reception of a request signal to produce a second clock signal which is in a defined time relationship with the request signal and to deliver it to the internally synchronous circuit block, and wherein there is provided a time-out unit which is connected to the input unit and which is adapted to suppress delivery of the first clock signal.

The invention is based on the realisation that a GALS block for processing a continuous data stream operates most effectively in a quasi-synchronous mode. In accordance with the invention a quasi-synchronous mode can be implemented in which a GALS block is operated in an operating mode which is driven by request signals (referred to as 'request driven'). The internally synchronous circuit block is accordingly clock controlled whenever data actually arrive at its input. In the case of an asynchronous wrapper, request signals enter from the outside, that is to say from an adjacent asynchronous wrapper which precedes in the data flow when data are present for input at the local, internally synchronous circuit block.

Accordingly the basic idea of the apparatus according to the invention is embodied in the input unit which is adapted for the delivery of a clock signal (indicated in some places here as the 'second' signal only for distinguishing purposes) in a defined time relationship with the inputted request signal. In principle the apparatus according to the invention can also operate without a pausable clock unit and without a time-out unit. The consequence of this is that it is clock controlled solely by means of the second clock signals. In the absence of request signals, the locally synchronous circuit would not be clock controlled in that case. That admittedly suffers from the disadvantage that data which have remained in the pipeline of the synchronous circuit are not outputted. Nonetheless the output would be continued with a renewed receipt of request signals. To obviate that disadvantage, in accordance with the invention, the internally synchronous circuit is clock controlled by means of two alternative sources, either by means of the clock unit or by means of the input unit, on the basis of request signals. It would also be possible to refer to 'multiplexing' of the first and second clock signals. The clock control which is synchronised with incoming request signals, by the 'second' clock signals, basically has priority over clock control by means of 'first' clock signals from the clock unit. In that respect however it is guaranteed that a clock period of a 'first' clock signal is concluded before a 'second' clock signal is delivered to the internally synchronous circuit block.

In accordance with the invention a second clock signal is synchronised with a currently received request signal by the second clock signal being produced in defined time relationship with the request signal. The defined time relationship can signify for example that the rising edge and the falling edge of the second clock signal are produced in a fixed time spacing relative to the rising edge and the falling edge of the request signal. Upon the receipt of a request signal which enters in the context of a continuous data stream, clock control with a clock signal by a specifically provided clock generator is dispensed with. Such a clock generator is nonetheless a constituent part of the asynchronous wrapper according to an aspect of the invention, in order if necessary also to be able to drive the internally synchronous circuit block without an applied request signal.

The arrangement according to the invention has various advantages. It firstly makes it possible to dispense with a global clock tree. If there are no request signals from the outside, the arrangement according to the invention permits clock control by means of the first clock signals only when required, that is to say for example as long as data are present for delivery to the outside in the pipeline of the internally synchronous circuit. The asynchronous wrapper according to the invention can therefore provide for a low power consumption on the part of a GALS block, which is oriented to the actual data processing need. In addition, according to an aspect of the invention, by virtue of the clock control which is dependent on request signals, there are only few boundary conditions for the clock frequency of the local clock generator which produces the 'first' clock signals. The clock frequency of a local clock generator does not have to be adapted in particular to the data rate. That allows a simple design configuration in respect of a ring oscillator of the local clock generator.

In a first embodiment of the invention the time-out unit is adapted with the expiry of a predetermined period of time after delivery of the last second clock signal to deliver a control signal for enabling the delivery of the first clock signal. This embodiment involves waiting during a so-called time-out period of time, after the last request signal, before clock control by the local clock generator replaces clock control by incoming request signals. That has the advantage on the one hand that clock control does not jump to and fro uncontrolledly between the first and second clock signals if no request signal is applied only for a short time. On the other hand, enablement of the first clock signal makes it possible to empty the pipeline of the local, internally synchronous circuit, independently of the presence of a request signal, and thus to obtain an interconnected data flow over a plurality of GALS blocks as such.

A second embodiment which is an alternative to the first embodiment is based on the idea of providing for supplementing the communication protocol between the asynchronous wrappers of adjacent GALS blocks, instead of waiting for a given period of time by means of the time-out unit. In this alternative embodiment, with a corresponding signal, the asynchronous wrapper of the preceding GALS block indicates that a current request signal is the last request signal for the time being. The signal can be a modified request signal or a separate signal which is to be transmitted in parallel with a request signal. For example the output unit of the asynchronous wrapper can be adapted for emitting the signal. The corresponding circuitry conversion procedure involved is known per se to the man skilled in the art. The input unit is correspondingly adapted to receive the signal. It can also deal with the function of delivering the enable signal for the first clock signal, which is performed in the first embodiment by the time-out unit.

To optimise the power consumption, the first and the second embodiments should provide that clock control by means of the first signal is effected only as long as data are present in the pipeline. Preferably therefore there is provided a clock control unit which is connected to the clock unit and to the input unit and which is adapted to drive the clock unit to deliver a number of clock pulses, wherein the number of clock pulses is less than or equal to the depth of a pipeline of the associated, internally synchronous circuit block. In that way, clock control of the internally synchronous circuit can be interrupted after emptying of the pipeline, until request signals are again present.

To pause or interrupt the clock control by means of the first clock signal the clock control unit is preferably adapted to send a control signal for stopping to the clock unit after delivery of the said number of clock pulses.

In the asynchronous wrapper according to the invention, the input unit is preferably adapted to deliver a control signal to the internally synchronous circuit block for enabling data input, when a request signal is applied. A plurality of input units can be provided. That is appropriate for example if the GALS block is connected at the input side to a plurality of other GALS blocks.

Equally, it is possible to provide one or more output units which are adapted to send a request signal to the outside and, in response to the reception of a acknowledgement signal from the outside, to deliver a control signal to the internally synchronous circuit block for enabling a data output.

Preferably, the communication between an output unit of a first GALS block on the one hand and a connected input unit of a second GALS block on the other hand is effected by way of a four-phase handshake protocol which is known per se to the man skilled in the art. The input unit and the output unit are preferably respectively adapted to communicate by means of the four-phase handshake protocol.

GALS blocks with an internally synchronous circuit block and an asynchronous wrapper can be implemented by means of the asynchronous wrapper according to the invention. Taking various such GALS blocks, it is possible to implement GALS architectures in highly integrated circuits, including at least one internally synchronous circuit block and a respectively associated asynchronous wrapper.

In a GALS block according to the invention, a data latch is preferably connected upstream of a data input of the internally synchronous circuit block, the operation of the data latch being controlled by the input unit. It serves on the one hand in known manner for buffering incoming data. On the other the data latch prevents the occurrence of metastable conditions at the input of the internally synchronous circuit block.

In accordance with a second aspect of the invention, to attain the above-indicated object, there is proposed a method of clock control of an internally synchronous circuit block of an integrated circuit by means of an asynchronous wrapper, wherein the internally synchronous circuit block can be clock controlled by means of a first clock signal which a local clock signal generator can produce. The method according to the invention has the following steps:

a) pausing the delivery of the first clock signal or switching off the local clock generator, b) waiting for the reception of a request signal from the outside at the input of the asynchronous wrapper, c) delivering a second clock signal from the asynchronous wrapper to the internally synchronous circuit block in a defined time relationship with the reception of the request signal and without the aid of the local clock signal generator, and d) waiting for the reception of a next request signal from the outside and possibly repeating the preceding step.

The method according to the invention breaks with the asynchronous clock method which is currently usual in connection with GALS architectures and in which the local clock signal can be delayed if required. In place thereof it proposes a clock control which is oriented to the presence of a request signal. The local (first) clock signal is paused or the local clock signal generator switched off. A clock signal which in the context of the present application is referred to as the 'second clock signal' is directly derived for the locally synchronous block, from the incoming external request signal.

The local clock generator serves exclusively to empty internal pipeline stages of the locally synchronous circuit if no external request signal is applied over a given period of time. The advantages of the method are apparent directly from the foregoing description in relation to the asynchronous wrapper according to the invention.

An embodiment of the method according to the invention, in the absence of a request signal over a predeterminable period of time, involves switching over to the delivery of the first clock signal which is produced by means of the local clock signal generator. In this embodiment the local clock signal generator is switched off again preferably after emptying of a pipeline of the internally synchronous circuit block or after the arrival of a fresh request signal. The advantages of these embodiments of the method according to the invention are also apparent from the description of the apparatus according to the invention.

BRIEF DESCRIPTION OF THE DRAWINGS

Further features and advantages of the invention are made clear hereinafter by means of the description of embodiments by way of example with reference to the accompanying Figures in which.

DETAILED DESCRIPTION OF THE INVENTION

Figure 1:
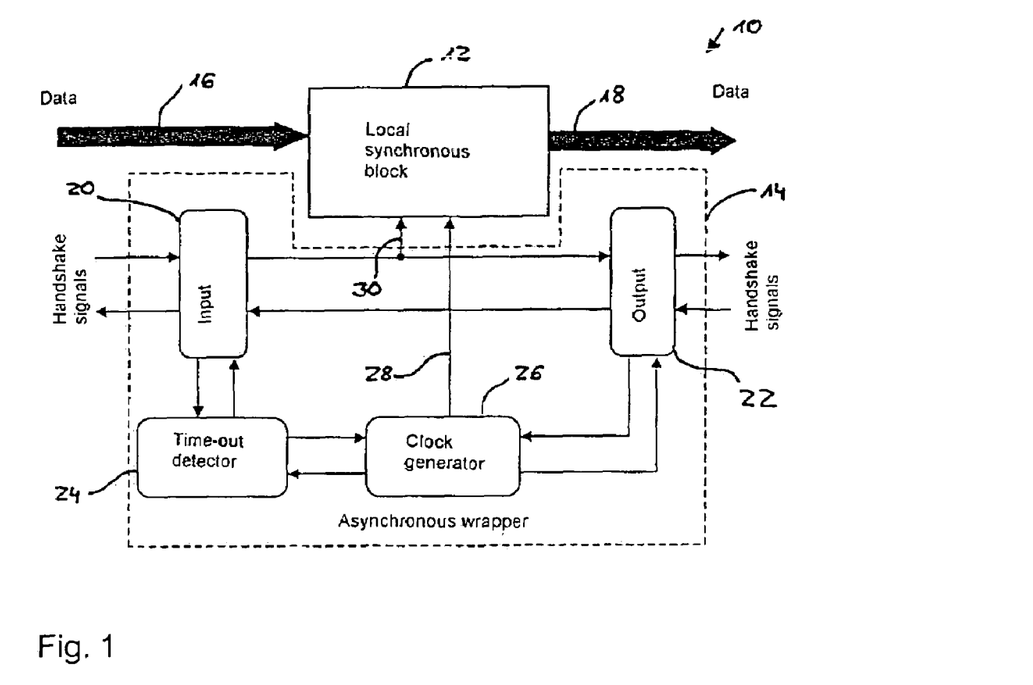
FIG. 1 shows a block circuit diagram of an embodiment of an asynchronous wrapper.

FIG. 1 shows a simplified block diagram of a circuit 10 having a local synchronous block 12 and an asynchronous wrapper 14. The locally synchronous block 12 has inputs and outputs (not described in greater detail herein) for data which are exchanged with adjacent circuit blocks. That is symbolically indicated by arrows 16 and 18.

The asynchronous wrapper of the circuit 10 has an input 20 for receiving and emitting handshake signals. The input communicates by means of the handshake signals for example with an output of an adjacent, similar asynchronous wrapper (not shown) which precedes in the data flow. Connected to the input 20 is an output 22 which in a similar manner exchanges handshake signals with the environment. For example the output 22 communicates with an input of an adjacent, similar asynchronous wrapper (also not shown) which follows in the data flow. A time-out detector 24 is connected on the one hand to the input 20 and on the other hand to a clock signal generator 26. The connection of the clock signal generator 26 to the time-out detector 24 is effected by way of control inputs. The clock signal generator 26 is also connected to the output 22 by way of a control input and output.

The connection of the locally synchronous block 12 (in this application also referred to as being internally synchronous) to the asynchronous wrapper 14 is effected by way of control lines 28 and 30. A clock signal from the clock signal generator 26 and request signals of external circuits from the input 20 are passed to the locally synchronous block 12 by way of the control lines 28 and 30.

Accordingly the locally synchronous circuit 12 is driven both by incoming request signals from external circuits and also by the local clock signal. A request signal which is passed by way of the input 20 originates from an asynchronous wrapper of an adjacent circuit block. It is synchronised with data which reach the locally synchronous block 12 by way of the data line 16.

The concept behind the present embodiment is based on a distributed control mechanism which is referred to as a token flow approach. Each locally synchronous block 12 of various circuits 10 which are combined in a system has its own asynchronous wrapper. That asynchronous wrapper additionally sends signals to adjacent wrappers which provide information about the instantaneous condition of the wrapper. In this connection, the combination of a data unit with an item of information relating to the validity of that data unit is referred to as a token. The adjacent wrappers operate their respective locally synchronous block 12 in dependence on that signal. In addition the modules which belong to a locally synchronous block produce a further signal for transmission to the functionally following module which indicates the end of operation. In dependence on that signal, the module accepts the data of the preceding module and processes same.

If no request signal is present at the input 20 for a predetermined period of time, the wrapper 14 changes into another condition in which it produces internal clock signals by means of a local ring oscillator which is described in greater detail hereinafter. The number of the internally produced clock signals is so established that it is equal to the number of clock cycles which are necessary to empty the pipeline of the locally synchronous circuit 12. As soon as no more valid data are in the synchronous block, the clock signal generator 26 stops. The locally synchronous block 12 is then inactive until a next request signal arrives.

The arrival of a request signal is detected on the basis of a change in the condition at the input 20. Usually in that case the detection of a rising signal edge is interpreted as the arrival of a fresh request signal.

When a request signal is detected at the input 20 while the locally synchronous block is driven after the detection of a time-out by the local clock signal generator, firstly the current clock signal must be terminated in order to avoid metastability at the data inputs of the locally synchronous block 12. The clock signal production can then be changed over from the local ring oscillator of the clock signal generator 26 to the input line 30. Further circuits which are described in greater detail hereinafter are required to prevent metastability in the management of that situation.

The circuit architecture proposed here enjoys numerous advantages. As in any GALS system, first of all no global clock tree is required. The clock signal is produced by 'multiplexing' of the local clock signal and the request signals. On the basis of operation driven by request signals, the frequency of the local clock signal generator does not have to coincide precisely with the frequency of a global clock signal generator or with the data rate. That reduces the number of boundary conditions in respect of the design of the ring oscillator. The present implementation further does not require a large register capacity for input data in the locally synchronous block 12. That avoids an unwanted delay and at the same time simplifies the hardware structure of the system. In the case of the concept which is involved here the locally synchronous block 12 responds directly to request signals and thus avoids delays.

A further advantage of the use of a token flow approach in the circuit concept proposed here is that, instead of locally synchronous pipelines, it is equally possible to use completely asynchronous circuits, if that is desired.

Finally the present architecture offers an efficient power saving mechanism. A respective synchronous block 12 is driven only when data are present at its input or when expulsion of the data which have still remained in the local pipeline is required. At all other times the locally synchronous block 12 is out of operation.

Figure 2:
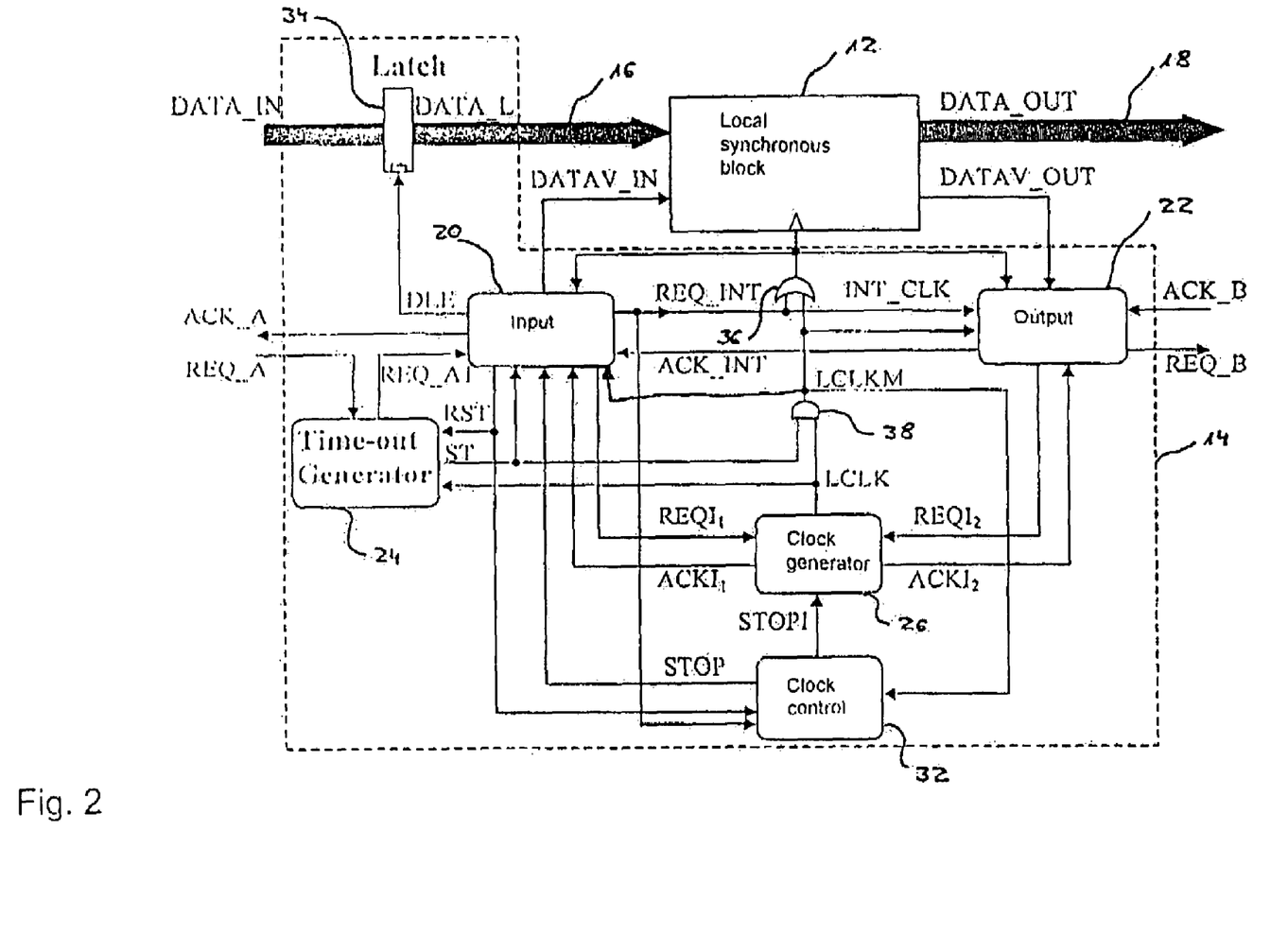
FIG. 2 shows a detail block circuit diagram of the asynchronous wrapper of FIG. 1.

FIG. 2 shows a detailed block diagram of the GALS block of FIG. 1. In addition to the components shown in FIG. 1 the asynchronous wrapper 14 has a clock control 32 and a transparent latch 34.

The function of the asynchronous wrapper 14 is described in greater detail hereinafter with reference to FIGS. 2 through 9. Besides the functional blocks, FIG. 2 also shows their connections and the signals transmitted on the connections. The connecting lines indicate the direction of transmission of the signals, by the directional arrows.

Clock control of the locally synchronous module 12 is effected with a signal INT_CLK. The signal INT_CLK is the output signal of an OR gate 36, to the inputs of which are applied on the one hand a signal REQ_INT and on the other hand a signal LCLKM. The signal REQ_INT is produced by the input 20 when a request signal REQ_A has been received from the outside by way of the time-out generator 24 in the form of a further signal REQ_A1 at the input. Details relating to the structure and function of the time-out generator 24 are described hereinafter with reference to FIG. 5. The signal LCLKM is the output signal of an AND gate 38, whose two inputs are connected on the one hand to the clock generator 26 and on the other hand to the time-out generator 24. The function of the AND gate 38 involves permitting the time-out generator 24, by means of a signal ST, to control the transfer of the output signal LCLK of the clock generator 26 to the OR gate 36.

The signals REQ_INT and INT_CLK mutually exclude each other. For that reason the INT_CLK signal which reaches the locally synchronous module 12 is always produced uniquely either on the basis of a request signal from the outside or on the basis of clock control by the clock generator 26, which is controlled by the time-out generator 24.

Data signals DATA-IN which arrive from the outside by way of the data line 16 are buffered in the transparent latch 34. That is required to prevent a metastable condition at the input of the locally synchronous block. Operation of the latch 34 is controlled with a signal DLE, wherein the register is transparent when the signal DLE is applied. The signal DLE is applied after a signal change in the clock generator 26 if data stored in the latch previously was already written into the register stage of the locally synchronous module 12. There is no need for the locally synchronous module 12 to have further registers. The incoming data can then be passed directly to a logic block (not shown) which is connected upstream of the first register stage (also not shown).

Figure 3:
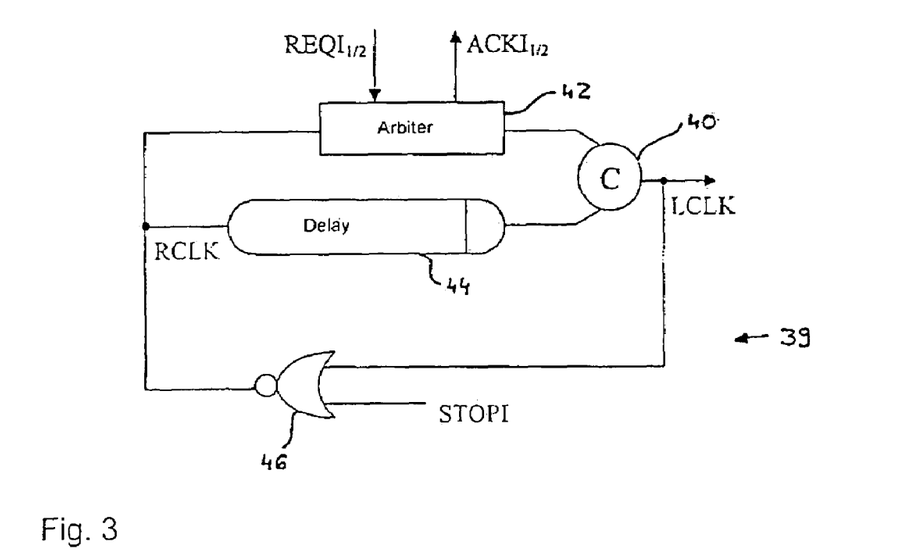
FIG. 3 shows a circuit diagram of the clock signal generator of FIG. 2.

The structure and the function of the pausable clock generator 26 are described in greater detail hereinafter with reference to FIG. 3.

The local clock signal generator 26 has a ring oscillator 39 which comprises a Müller C element 40, a delay section 44 and an OR gate 46 (with downstream inverter). The ring oscillator 29 receives signals by way of two control inputs, on the one hand from an arbiter 42 and on the other hand by way of a second input of the OR gate 46. On the one hand the output signal LCLK of the ring oscillator is returned to the OR gate 46. On the other hand the OR gate 46 is connected to an output of the clock control 32, by way of which a signal STOPI can be applied.

The ring oscillator 39 can be stopped by means of the signal STOPI. The STOPI signal occurs in two cases: on the one hand immediately after a reset in order to prevent activation of the oscillator prior to the arrival of the first request signal in relation to the local block. On the other hand, after a time-out, that is to say when the number of local clock cycles is equal to the number of cycles which is necessary to output all valid data within the pipeline. In that situation the local clock signal is blocked off in order to prevent unnecessary power consumption.

The ring oscillator 39 can assume three basic modes: sleep mode, time-out mode and clock generator mode. In the sleep mode a stop signal STOPI blocks operation of the clock generator 26. In the time-out measurement mode the input handshake is enabled and the input waits for the arrival of a time-out event. A time-out event is the absence of a request signal at the input for a predetermined period of time ($T_{time-out}$). The input handshake also waits for a change in signal on the request signal line. In the present embodiment the clock generator is also adapted to produce a time-out signal. The clock generator mode is activated when a time-out has occurred. In other words, the locally synchronous block 12 is then clock-controlled in order to output all valid data in the pipeline.

Figure 4:
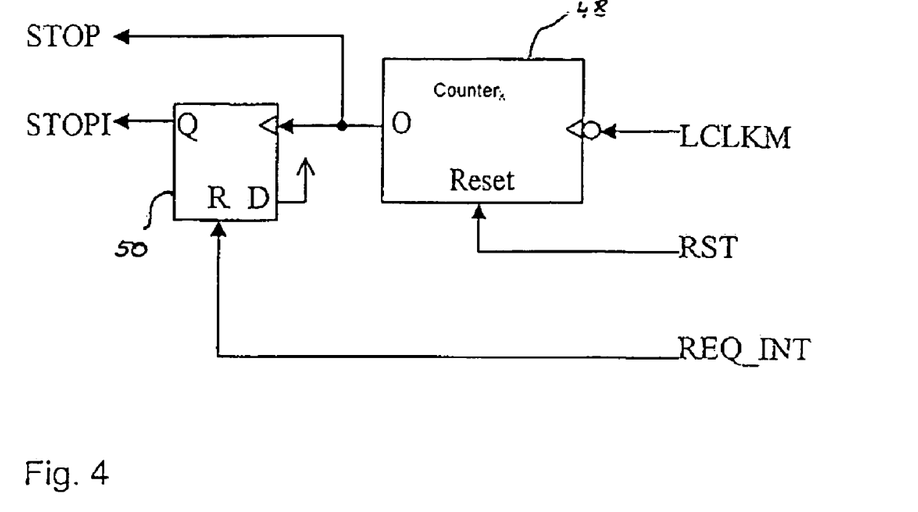
FIG. 4 shows a circuit diagram of the clock control from FIG. 2.

FIG. 4 shows a block diagram of the clock control 32. The task of the clock control 32 is control of the clock generator 26. The clock control 32 produces two output signals: STOPI and STOP. The signal STOP is a control signal for an asynchronous finite state machine (AFSM) of an input control which is associated with the input 20. This will be discussed in greater detail hereinafter in the context of FIGS. 6 and 7. When the STOP signal is applied the local clock signal is stopped. The STOP signal is activated when a counter 48 which is clock controlled with the local clock signal reaches a number which is equal to the depth of the synchronous pipeline. The signal STOPI is derived from the signal STOP by means of an additional D-type flip-flop 50. That signal is used directly as a control signal for the ring oscillator 39 of the clock generator. The D-type flip-flop serves to hold that signal in the activated condition until a new request signal arrives.

Figure 5:
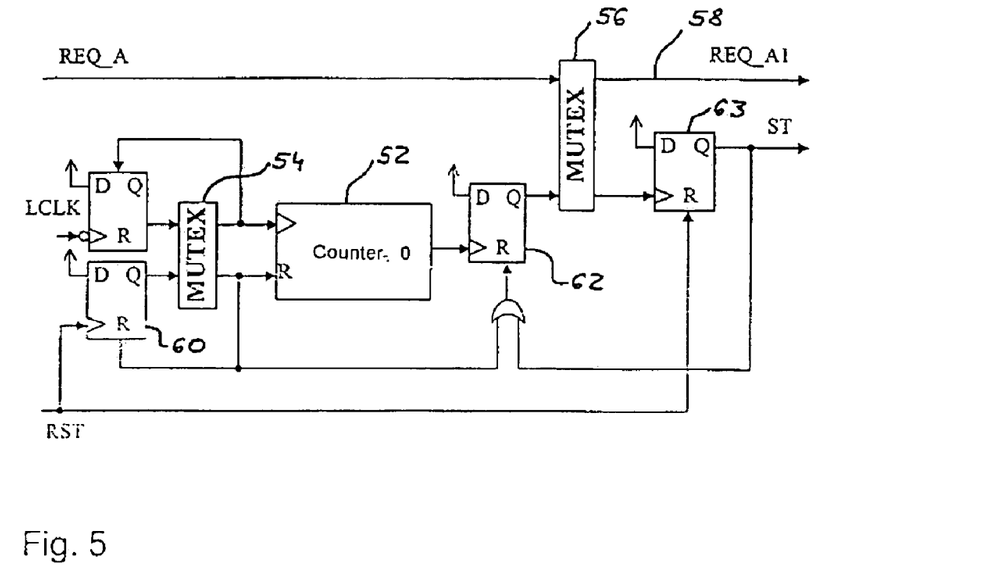
FIG. 5 shows a block circuit diagram of the time-out detector of FIG. 2.

FIG. 5 shows a block circuit diagram of the time-out detector 24. The time-out detector 24 has a counter 52. The counter 52 counts the number of negative, that is to say falling edges of the local clock signal. That counter is in the form of a standard synchronous counter. When it reaches its last value it produces a time-out signal. The reset signal RST is activated once during each handshake at the input port. The RST signal and the clock signal basically do not exclude each other. That fact conceals the risk of a metastable behaviour on the part of the counter 52. In order to avoid metastability an exclusion element 54 (mutual exclusion element or MUTEX) is connected upstream of the input of the counter 52. The MUTEX element triggers the simultaneous occurrence of a rising edge of the clock signal and a falling edge of the reset signal. A flip-flop 60 connected on the input side of the MUTEX element 54 serves for mutually exclusive occurrence of a reset and an LCLK signal at the input of the counter 52.

A further problematical situation is the simultaneous occurrence of an external request signal REQ_A and a time-out signal. Such a condition could harm the underlying burst mode operation and cause defective operation of the AFSM. A further MUTEX element 56 is provided to resolve that possible problem. In order to keep the line available for most of the time for the request signal REQ_A1, identified in FIG. 5 by reference 58, the time-out signal should be active on the input side of the MUTEX element 56 only for a very short period of time. That behaviour is achieved by means of two flip-flops 62 and 63. The first flip-flop 62 is set to a logic 'high' signal ('1') when a time-out occurs, that is to say when the output of the counter 52 is '1'. When a time-out is initiated subsequently to the arbitration step the second flip-flop 63 is switched. That switching of the second flip-flop 63 activates the signal ST. That in turn leads to resetting of the first flip-flop 62, which permits an external request signal REQ_A to be rapidly passed to the asynchronous fine state machine (AFSM) in the input 20.

Figure 6:
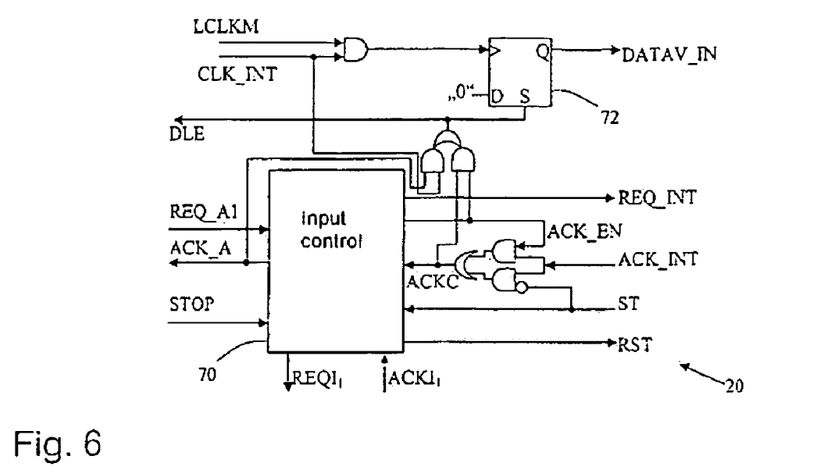
FIG. 6 shows a block diagram of the input of the wrapper of FIG. 2.

FIG. 6 shows a block circuit diagram of the input 20. The input 20 has an input control 70, the ports of which are specified in greater detail in FIG. 7. The function of the input control 70 is to guarantee a reliable data transfer. The input control 70 is in the form of an AFSM which operates in the burst mode.

In the normal mode of operation the input control reacts to incoming request signals and by means of a signal REQ_INT initiates the delivery of a clock signal for each incoming request signal.

If there is no request signal on the input lines for a given period of time, a signal ST is activated (time-out). In that condition the input control is adapted to react to two possible events: the first possible event is the termination of the expected number of internal clock signals, which is indicated by a signal STOP. In that way the input control 70 is reset to its initial condition. The second possible event is the arrival of a request signal during the output of remaining data in the pipeline. In that case a local clock signal which has already begun must be sure to be concluded and the control of the clock signal must be transferred to the request signal. In the present embodiment the input control 70 is connected to a circuit which follows a 'broad' four-phase handshake protocol.

The input control 70 does not produce a transfer to a clock control by means of the request signal before half of a clock signal after the preceding transfer of the request signal.

The further circuit elements which are shown in FIG. 6 serve to suppress an acknowledgement signal ACK_INT produced by the output 22 during local clock production by means of the clock generator 26. ACK_INT is enabled when the transfer is effected from the local clock production again to the mode of operation driven by the request signal. That happens by activation of a signal ACK_EN.

A flip-flop 72 is provided to produce a signal DATAV_IN which is provided to the locally synchronous module 12 and which indicates that currently valid data are present at the input of the locally synchronous module 12.

The input described here involves an input of 'pull type'. In a similar manner it is possible to construct an input of the 'push type', with only slight modifications which are known to the man skilled in the art.

Figure 7:
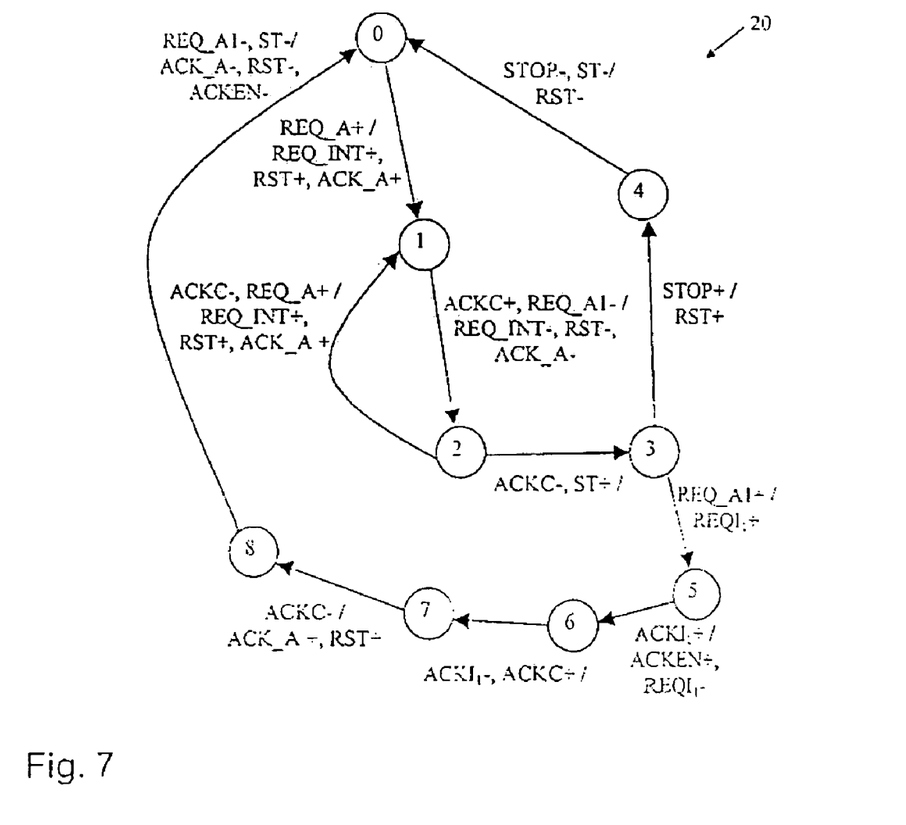
FIG. 7 shows a specification of an input control of the input of the wrapper of FIG. 2.

For supplemental description of the graph in FIG. 7 ('signal transition graph'), set out hereinafter are the logical equations which form the basis for the output signals of the input control 70. In this case a prime at the end of a signal denotes the inversion of that signal, a plus sign denotes a logical 'or' and a multiplication sign denotes a logical 'and'.

REQ_INT=REQ_A1·REQ_INT+ACKC'·REQ_INT+
   REQ_A1·ACKC'·ST'·Z0'

ACK_A=ACKC'·REQ_INT+ST·ACK_A+REQ_A1·RST+
   REQ_A1·ACKC'·Z0+REQ_A1·ACKC'·ST'·Z0'

ACKEN=ACKI$_1$+ACKC·ACKEN+ACKEN·Z0'

RST=STOP+CKC'·REQ_INT+REQ_A1·RST+
   ACKC'·ST·Z0+REQ_A1·ACKC'·ST'·Z0'

REQI$_1$=REQ_A1·ST·ACKI$_1$'·ACKEN'·Z0'

Z0=STOP+REQ_A1·Z0+ST·Z0+ACKC·ACKI$_1$'·ACKEN

Z1=REQ_A1'·ACKC+ACKC·Z1+REQ_A1'·ST'·Z1

Z0 and Z1 are internal signals which ensure defect-free operation of the input control 70.

Figure 8:
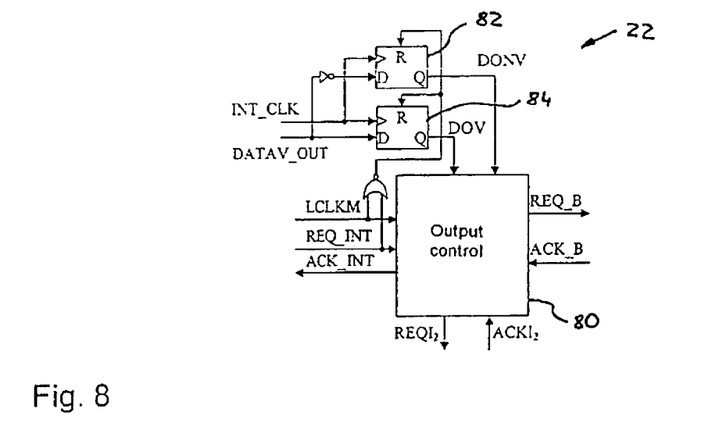
FIG. 8 shows a block diagram of the output of the wrapper of FIG. 2.
Figure 9:
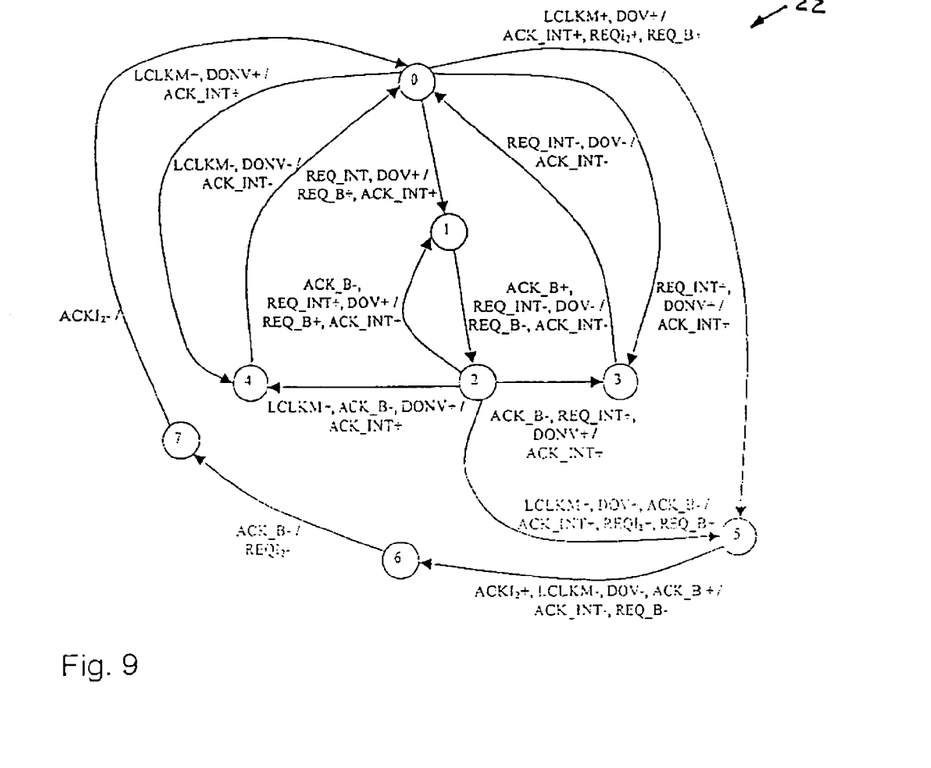
FIG. 9 shows a specification of an output control of the output of FIG. 8.

The structure and function of the output 22 are described hereinafter with reference to FIGS. 8 and 9. FIG. 8 shows a block diagram of the output 22. The output 22 has an output control 80 in the form of an asynchronous fine state machine (ASFM) and two flip-flops 82 and 84. The flip-flops 82 and 84 serve to condition the signals which indicate that output data are valid (DOV) or not valid (DONV) in order to be able to further use those signals accordingly in the output control 80. As the AFSM of the output 20 is event-controlled and not level-controlled, the level-based signal DATAV_OUT is transformed into two event-based signals DOV and DONV by a procedure whereby they are switched by means of the signal INT_CLK which is delayed in a delay element 86 (in the sense of a 'strobing'). The output control can be excited from two mutually exclusive sources: by means of the internal request signal REQ_INT and by means of the local clock signal LCLKM. If no valid data are present at the output 20, in other words DONV is activated, each request signal which is indicated either by activation of the REQ_INT or LCLKM is activated immediately by activation of the signal ACK_INT. If output data have to be transmitted to the next GALS block, that is to say DOV is activated, an output handshake must be implemented by means of the signals REQ_B and ACK_B. In that case the internal handshake (signals REQ_INT and ACK_INT) must be coupled to the output handshake (signals REQ_B and ACK_B). If both DOV is activated and the signal LCLKM is applied, the local clock generator must be delayed by means of the signals REQI$_2$ and ACKI$_2$ until an output handshake is implemented. That prevents a new clock cycle from beginning before data transfer at the output is concluded.

The logical equations for implementation of the asynchronous finite state machine of the output control 80 are as follows:

REQ_B=REQ_INT·REQ_B+ACK_B'·REQ_B+
   LCLKM·REQI$_2$+A−CKI2'·REQI$_2$+DOV·ACK_INT+
   LCLKM·ACK_B'·DOV+REQ_INT·ACK_B'·DOV

REQI$_2$=ACK_B·REQI$_2$+REQI$_2$·ACK_INT+
   LCLKM·ACK_B'·DOV

ACK_INT=ACK_B'·REQ_B+ACKI2'·REQI$_2$+
   LCLKM·ACK_INT+REQ_INT·ACK_INT+
   DOV·ACK_INT+DONV·ACK_INT+
   LCLKM·ACK_B'·DOV+REQ_INT·ACK_B'·DOV
   LCLKM·ACK_B'·DONV+REQ_INT·ACK_B'·DONV

Z0=·ACK_B+REQ_B+LCLKM·DOV+REQ_INT·DOV+
   A−CK12'·DONV'·Z0+LCLKM'·REQ_INT'·ACKI$_2$'·Z0

Z0 is an internal signal which was added for reliable operation of the AFSM. The output port 22 described here is of the 'push type'. The structure of an output port of the 'pull type' would be very similar.

The circuit described herein with reference to FIGS. 2 through 9 allows a new request signal to enter at the input 20 during the output of data which have remained in the pipeline. That leads to a markedly more complicated circuit structure and involves additional control and evaluation circuits. For certain uses therefore the wrapper described here can be markedly simplified.

Figure 10:
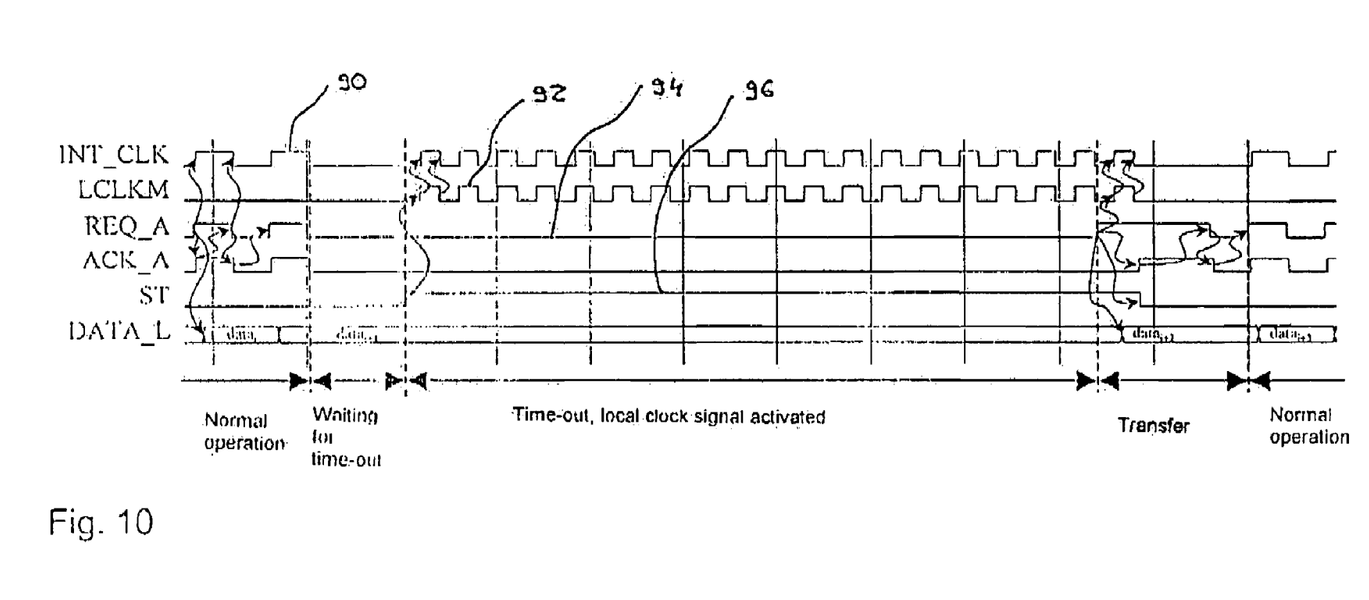
FIG. 10 shows a diagram with a representation of the variation in respect of time of various signals in different modes of operation of the asynchronous wrapper.

FIG. 10 shows the result of a simulation of the operation of the asynchronous wrapper of FIG. 2 for various modes of operation. A 21-stage FIFO register was selected for the simulation, as the locally synchronous module 12. The simulated overall system comprises three successively connected GALS blocks. FIG. 10 shows the patterns in respect of time of various signals. The uppermost line shows the pattern in respect of time of the signal INT_CLK on the basis of a signal pattern 90 in respect of time. The signal INT_CLK occurs within a respective asynchronous wrapper. It will be apparent here that the signal INT_CLK arises out of the signals LCLKM and REQ_A, as has already been described with reference to FIG. 2. In the normal mode of operation a handshake occurs on the lines REQ_A and ACK_A. Each request signal is interpreted as a new clock cycle. If the signal REQ_A remains at 0 the wrapper waits for the occurrence of a time-out. During the waiting period the internal clock signal production is switched off. The occurrence of a time-out is activated with a signal ST. That causes activation of the local clock signal LCLK which again drives the signal INT_CLK. If the signal REQ_A 94 indicates the occurrence of new data prior to the deactivation of LCLKM, a transfer is initiated. In that mode a local clock cycle is completely concluded and then control by way of the internal clock signal is given to the request line REQ_A 94. Finally, the transfer is made to the normal mode of operation which also prevailed at the beginning.

Figure 11:
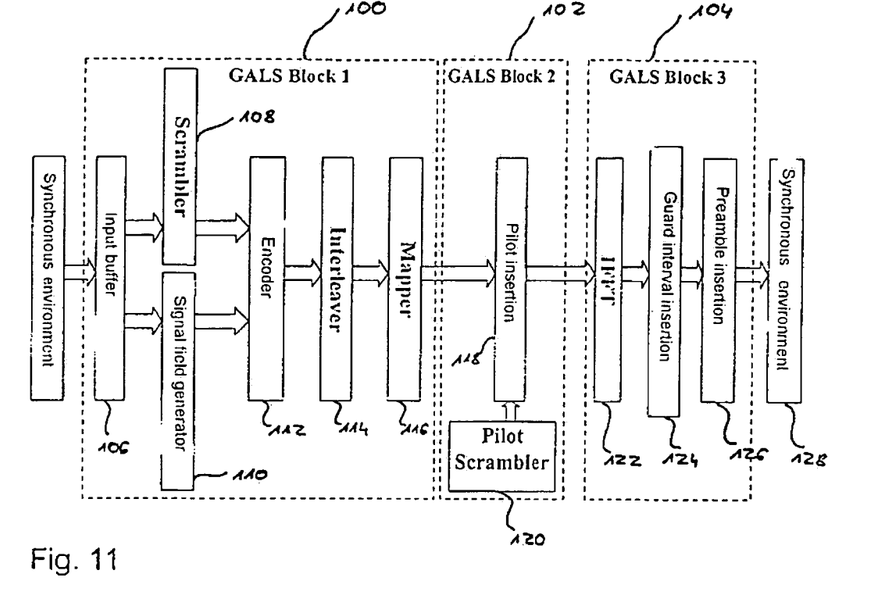
FIG. 11 shows a block circuit diagram of an example of use in the form of a baseband transmitter for wireless communication.

FIG. 11 shows as an embodiment by way of example of a GALS system a baseband processor for a wireless broadband communication system integrated on a chip in a 5 GHz band corresponding to the Standard IEEE 802.11a. That Standard specifies a broad-band communication system using OFDM (orthogonal frequency division multiplexing) with data rates in the range of between 6 and 54 Mbit/s. The baseband transmitter shown in FIG. 11 has three GALS blocks 100, 102 and 104. Associated with each of the GALS blocks 100, 102 and 104 is an asynchronous wrapper which is not shown here in the functional illustration of the baseband transmitter. Division of the blocks follows considerations in terms of the functionality and the complexity of the functional blocks of the baseband transmitter. The first GALS block 100 has an input buffer 106, a scrambler 108, a signal field generator 110, an encoder 112, an interleaver 114 and a QAM mapper 116. The specified blocks 106 through 116 are known per se to the man skilled in the art. The most extensive blocks of the GALS block 100 are the interleaver 114 and the mapper 116. The second GALS block has a pilot channel insertion unit 118 and a pilot scrambler 120. The third GALS block 104 includes a block 122 for performing inverse fast Fourier transform, a guard interval insertion unit 124 and a preamble insertion unit 126. The IFFT unit 122 takes up about 85% of the circuitry involvement of the GALS block 3. The described synchronous blocks 100, 102 and 104 with their sub-blocks 106 through 126 are constructed in a token flow style. One problem is that the third block 104 must supply output data at an established speed for passing to a digital/analog converter (not shown). That is achieved by the local oscillator of the block 104 being tuned to a frequency which is somewhat greater than the fixed clock frequency of the digital/analog converter. The output data are then practically extracted from the locally synchronous 104 at the desired frequency of the digital/analog converter by means of the signal ACK. A test gave a data throughput of about 100 Msps between the GALS block 104 and the external synchronous environment 128.

The invention claimed is:

1. An asynchronous wrapper wherein the asynchronous wrapper is responsible for a conversion of an asynchronous communication of an associated locally synchronous circuit block with an external other locally synchronous circuit block having its own asynchronous wrapper, the asynchronous wrapper comprising
 at least one input unit which is adapted to receive a request signal from outside the asynchronous wrapper and to indicate to the outside the reception of the request signal by the delivery of an associated acknowledgement signal, and
 a pausable clock unit which is adapted to repeatedly produce a first clock signal and deliver it to an internally synchronous circuit block associated with the asynchronous wrapper,
 characterised in that
 the input unit is adapted to produce, if a request signal is applied, a second clock signal which is in a defined time relationship with the request signal and to deliver it to the internally synchronous circuit block, and
 there is provided a time-out unit which is connected to the input unit and which is adapted to suppress delivery of the first clock signal to the favor of the delivery of the second clock signal.

2. An asynchronous wrapper as set forth in claim 1 wherein the timeout unit is adapted to suppress the delivery of the first clock signal to the favor of the delivery of the second clock signal.

3. An asynchronous wrapper as set forth in claim 1 wherein the time-out unit is adapted with the expiry of a predetermined period of time after delivery of the last second clock signal to deliver a control signal for enabling the delivery of the first clock signal.

4. An asynchronous wrapper as set forth in claim 1 having a clock control unit which is connected to the clock unit and to the input unit and which is adapted to drive the clock unit for the delivery of a number of clock pulses, wherein the number of clock pulses is less than or equal to the depth of a pipeline of the associated, internally synchronous circuit block.

5. An asynchronous wrapper as set forth in claim 4 wherein the clock control unit is adapted to send a control signal for stopping to the clock unit after delivery of the necessary number of clock pulses.

6. An asynchronous wrapper as set forth in claim 1 wherein the input unit is adapted, when a request signal is applied, to deliver a control signal to the internally synchronous circuit block for enabling a data input.

7. An asynchronous wrapper as set forth in claim 1 comprising at least one output unit which is adapted to send a request signal to the outside and upon the reception of an acknowledgement signal from the outside to deliver a control signal to the internally synchronous circuit block for enabling a data output.

8. An asynchronous wrapper as set forth in claim 7 wherein the input unit and the output unit are adapted to communicate with the outside by way of a four-phase handshake protocol.

9. A globally asynchronous locally synchronous (GALS) circuit including at least one internally synchronous circuit block and a respectively associated asynchronous wrapper as set forth in claim 1.

10. A GALS circuit as set forth in claim 9 wherein connected upstream of a data input of the internally synchronous circuit block is a data latch whose operation is controlled by the input unit.

11. A method of clock control of an internally synchronous circuit block of an integrated circuit by means of an asynchronous wrapper, wherein the asynchronous wrapper is responsible for a conversion of an asynchronous communication of an associated locally synchronous circuit block with an external other locally synchronous circuit block having its own asynchronous wrapper, wherein the internally synchronous circuit block can be clock controlled by means of a first clock signal which a local clock signal generator can produce, comprising the steps:
 a) pausing the delivery of the first clock signal or switching off the local generator,
 b) waiting at the input of the asynchronous wrapper for the reception of a request signal from outside the asynchronous wrapper,
 c) delivering a second clock signal from the asynchronous wrapper to the internally synchronous circuit block in a defined time relationship with the reception of the request signal and without the aid of the local clock signal generator, and
 d) waiting for the reception of a next request signal from the outside.

12. A method as set forth in claim 11 wherein, in the absence of a request signal over a predeterminable period of time (time-out), switching over is effected to the delivery of the first clock signal which is produced by means of the local clock signal generator.

13. A method as set forth in claim 12 wherein the local clock signal generator is switched off after emptying of a pipeline of the internally synchronous circuit block or after the arrival of a new request signal.

14. An asynchronous wrapper as set forth in claim 6 wherein the input unit and the output unit are adapted to communicate with the outside by way of a four-phase handshake protocol.

15. An asynchronous wrapper as set forth in claim 14 comprising at least one output unit which is adapted to send a request signal to the outside and upon the reception of an acknowledgement signal from the outside to deliver a control signal to the internally synchronous circuit block for enabling a data output.

* * * * *